3,202,712
1-CYCLOHEXENE-4-BIS(O-CHLOROBENZYLAMI-
NOMETHYL) AND DERIVATIVES
Leslie G. Humber, Montreal, Quebec, Canada, assignor to
American Home Products Corporation, New York,
N.Y., a corporation of Delaware
No Drawing. Filed Feb. 5, 1963, Ser. No. 256,270
3 Claims. (Cl. 260—570.5)

This invention relates to novel chemical compounds, certain new derivatives of cyclohexene and to the process utilized in their preparation. More particularly my invention relates to aralkylaminoalkyl and substituted aralkylaminoalkyl derivatives of cyclohexene, which new chemical compounds possess valuable pharmacological properties.

The new chemical compounds, in base form, may be generically represented by the formula I I.
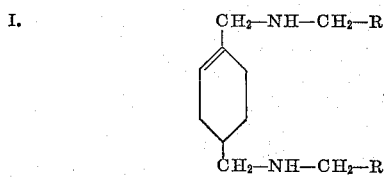

wherein R represents aryl or substituted aryl. The novel chemical compounds possessing interesting biological activities, in base form, are thus 1,4-bis (aralkyl or substituted aralkylaminoethyl)-1-cyclohexenes. These compounds, being basic in nature, form tertiary acid addition salts. Such acid addition salts with pharmacologically acceptable acids are biologically equivalent to the free bases, and constitute a preferred form for the administration of the compounds of my invention.

The new chemical compounds forming the subject of this invention are useful as agents for lowering cholesterol levels in the blood. For example Compound I, wherein R is ortho chloro phenyl, will lower the cholesterol blood level in the intact rat by up to 72 percent when administered orally at a dose of 10 micromoles per kilogram of body weight.

My preferred procedure for preparing the new chemical compounds may be described as follows:

1-cyclohexene-1,4-dicarboxylic acid is treated with thionyl chloride in a suitable solvent such as for example benzene. This results in the formation of the corresponding diacidchloride which is reacted with ammonia, preferably at low temperature with aqueous concentrated ammonia. The resulting diamide is reduced to 1-cyclohexene-1,4-bismethylamine, preferably with lithium aluminum hydride in refluxing tetrahydrofuran. The bismethylamine derivative of cyclohexene is caused to react with a suitable benzaldehyde or substituted benzaldehyde, and removing two molecules of water from the reaction mixture. The resulting benzylidine, or substituted benzylidine, derivative (a Schiff base) may then be reduced to the corresponding secondary amino derivative by treatment with a reducing agent, such as, for example, by treatment with sodium borohydride; hydrogen and platinum oxide; or lithium aluminum hydride. The free base is then recovered, preferably by evaporation off of the solvent. The resulting product may then be converted to a suitable acid addition salt, by conventional means, as for example by treatment with a pharmacologically acceptable acid. As an illustration the hydrochloride salts may be readily obtained by treatment of the base with hydrogen chloride in ether solution.

This process may be indicated schematically as follows:

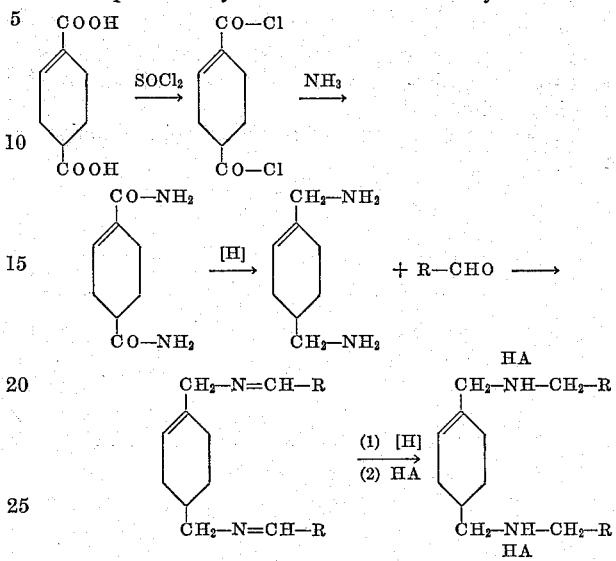

where R represents phenyl or a substtiuted phenyl radical, and HA represents a pharmacologically acceptable acid.

The following examples illustrate my invention.

EXAMPLE 1

*1-cyclohexene-1,4-dicarbonyl chloride*

1-cyclohexene-1,4-dicarboxylic acid (63 gm.) (prepared according to Bailey and Barcaly, J. Am. Chem. Soc. 81, 5395 (1959) was suspended in benzene and heated with thionyl chloride (211 gm.) for 22 hours. Distillation yielded 1-cyclohexene-1,4-dicarbonyl chloride; B.P. 140° C./0.06 mm. of mercury pressure.

EXAMPLE 2

*1-cyclohexene-1,4-dicarboxamide*

The diacid chloride of Example 1 (71 gm.) was added slowly with stirring to concentrated aqueous ammonium hydroxide (200 ml.) at 0° C. The solid amide, 1-cyclohexene-1,4-dicarboxamide, was isolated by filtration and washed with water. A sample, crystallized from dimethylformamide, had a melting point in excess of 310° C.

Analysis confirmed the empirical formula $C_8H_{12}O_2N_2$.

EXAMPLE 3

*1-cyclohexene-1,4-bismethylamine*

1-cyclohexene-1,4-dicarboxamide (24.6 gm.) was reduced with lithium aluminum hydride (10.9 gm.) by refluxing in tetrahydrofuran for 24 hours. Water was added carefully and the precipitated salts removed by filtration. The filtrate was dried with sodium sulphate and fractionated to yield 1-cyclohexene-1,4-bismethylamine as an oil; B.P. 76–78° C. (0.1 mm. of mercury pressure).

EXAMPLE 4

*1-cyclohexene-1,4-bis(o-chlorobenzylaminomethyl)*

1-cyclohexene-1,4-bismethylamine (5.2 gm.) and o-chlorobenzaldehyde (12.8 gm.) were refluxed in benzene for 6 hours and the liberated water was removed by azeotropic distillation. The benzene was removed to yield the corresponding Schiff's base as a solid, having a melting point of 127–130° C. It was dissolved in methanol and refluxed with sodium borohydride (3.5 gm.) for 24 hours. The methanol was removed and the residue distributed between water and benzene. The benzene layer was dried and evaporated to yield 1-cyclohexene-1,4-bis(o-chlorobenzylaminomethyl) as an oil λ max. 265 mμ ($\epsilon$=389).

The dihydrochloride salt was prepared by treatment of the base with ethereal hydrogen chloride. It was crystallized from a methanol-ether mixture and had a melting point of 274° C. Analysis confirmed the empirical formula $C_{22}H_{28}N_2Cl_4$.

I claim:
1. A compound selected from the group which consists of 1-cyclohexene-1,4-bis(o-chlorobenzylaminomethyl) and its dihydrochloride salt.
2. 1-cyclohexene-1,4-bis(o-chlorobenzylaminomethyl).
3. The dihydrochloride salt of 1-cyclohexene-1,4-bis(o-chlorobenzylaminomethyl).

References Cited by the Examiner

UNITED STATES PATENTS

| | | | |
|---|---|---|---|
| 2,692,282 | 10/54 | Brown | 260—563 X |
| 2,728,765 | 12/55 | Bernstein | 260—570.9 |
| 2,797,242 | 6/57 | Edgerton et al. | 260—570.8 |

FOREIGN PATENTS

| | | |
|---|---|---|
| 786,215 | 11/57 | Great Britain. |
| 872,943 | 7/61 | Great Britain. |

OTHER REFERENCES

Castorina: C.A., vol. 49, p 614f (1955).
Horii et al.: C.A., vol. 50, pp. 7756–7757 (1956).
Wagner et al.: "Synthetic Organic Chemistry," pp. 566, 660 and 661 (1953).
Werner et al.: J.A.C.S., vol. 80, pp. 2733–2736 (1958).

CHARLES B. PARKER, *Primary Examiner.*